UNITED STATES PATENT OFFICE.

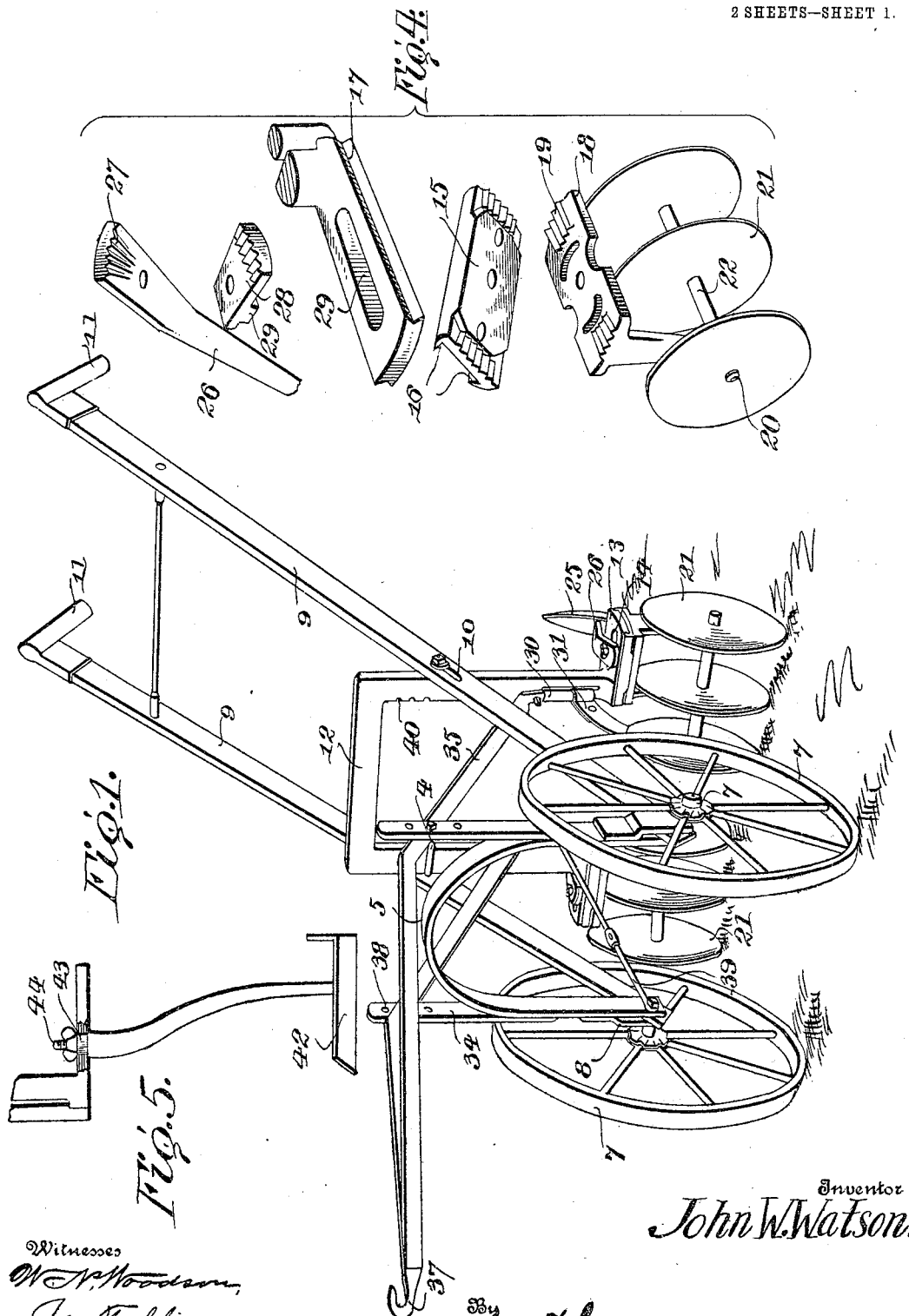

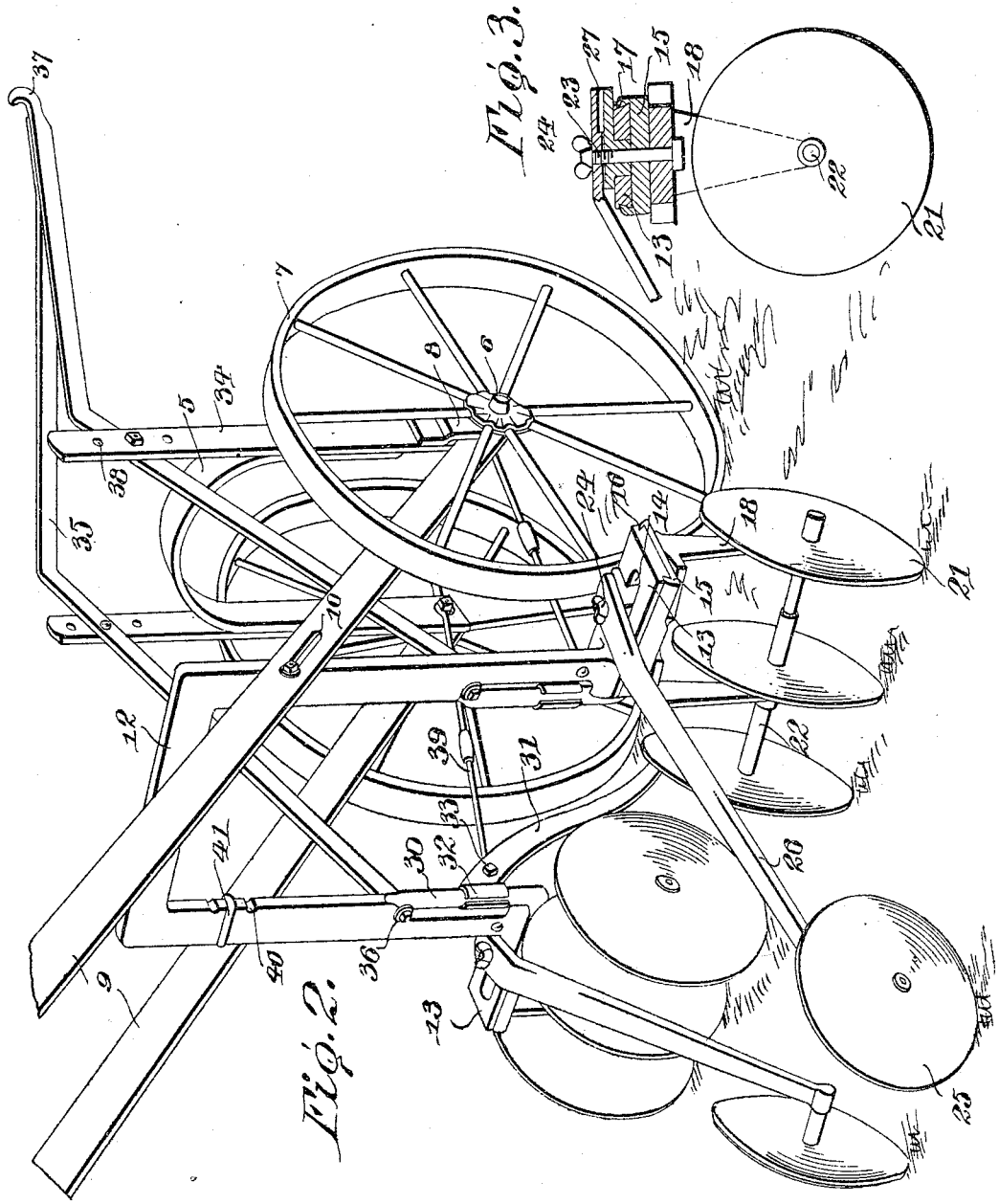

JOHN W. WATSON, OF NEWTON, IOWA.

ADJUSTABLE HAND DISK CULTIVATOR.

950,084.          Specification of Letters Patent.      Patented Feb. 22, 1910.

Application filed May 5, 1909. Serial No. 494,071.

*To all whom it may concern:*

Be it known that I, JOHN W. WATSON, citizen of the United States, residing at Newton, in the county of Jasper and State of Iowa, have invented certain new and useful Improvements in Adjustable Hand Disk Cultivators, of which the following is a specification.

This invention relates to cultivators and more particularly to a hand cultivator especially designed for use in truck gardens for cultivating strawberries, onions, beets and other growing crops.

The object of the invention is to provide a cultivator including a supporting frame or carriage having a plurality of concavo-convex disks mounted for rotation thereon and adjustable laterally with respect to the carriage, thereby to turn the soil and throw the latter toward or away from the growing plants.

A further object is to provide a cultivator having one or more trailing disks arranged to travel at the rear of a gang of revolving disks for the purpose of leveling the soil after being acted upon by said gang of disks.

A further object is to provide the supporting frame or carriage with depending lifting fingers which serve the dual function of breaking the ground and elevating vines and the like so as to permit the passage of the gang disks.

A further object is to provide a cultivator, the construction of which is such as to permit the ready removal of the disks and trailers and the attachment of one or more hoes when the device is used for shallow surface cultivation.

A still further object of the invention is generally to improve this class of devices so as to increase their utility, durability, and efficiency.

Further objects and advantages will appear in the following description, it being understood that various changes in form, proportions, and minor details of construction may be resorted to within the scope of the appended claims.

For a full understanding of the invention and the merits thereof and also to acquire a knowledge of the details of construction and the means for effecting the result, reference is to be had to the following description and accompanying drawings, in which:

Figure 1 is a perspective view of a hand cultivator constructed in accordance with my invention; Fig. 2 is a similar view looking at the rear end of the cultivator; Fig. 3 is a transverse sectional view of one of the disk carriers and associated parts; Fig. 4 is a perspective view of one of the disk carriers, the slide, filling block, trailing bar and a portion of the carrier support being shown in spaced relation above said disk carrier; Fig. 5 is a side elevation partly in section, of a hoe attachment for use in connection with the cultivator.

Corresponding and like parts are referred to in the following description and indicated in all the views of the drawings, by the same reference characters.

The improved hand cultivator forming the subject matter of the present invention, comprises a carriage or truck including an arched frame 5 having laterally extending stub axles 6 upon which are mounted the traction wheels 7.

Secured in any suitable manner to the side members of the frame 5 are brackets 8 having their lower ends spaced from the adjacent walls of the frame 5 and provided with openings for the reception of the stub axles 6. Seated in the pockets formed by the brackets 8, are the inner ends of a pair of handle bars 9 having their intermediate portions provided with elongated slots 10 and their terminals formed with hand grips 11 to facilitate guiding the cultivator when the latter is caused to travel over or between the rows of growing crops.

Interposed between the handle bars 9 at the slotted portions 10 thereof, is a yoke 12, the opposite legs of which are bent laterally to form horizontally disposed arms 13 having elongated slots 14 formed therein, for the purpose hereinafter referred to.

Slidably mounted on the lower face of each horizontal arm 13, is a plate 15 having oppositely disposed dove-tailed flanges 16 which engage correspondingly shaped grooves 17 formed in the opposite longitudinal edges of the arms 13, thereby to permit adjustment of the plate 15 on the arm 13, while at the same time preventing accidental separation of the parts.

Depending from each arm 13 is a disk carrier 18 preferably U-shaped in contour as shown, and arranged to bear against the lower face of the adjacent adjustable plate 15, the lower face of the plate 15 and the upper face of the carrier frame being provided with oppositely disposed teeth or serrations 19 adapted to interlock and thus hold the carrier frame at different positions of angular adjustment with respect to the carriage.

Secured to the opposite arms of each carrier frame, is a shaft 20, upon which are mounted for rotation a plurality of concavo-convex disks 21 adapted to turn the soil and throw the same laterally as the machine is caused to travel over the surface of a field or other area. Each disk 21 is provided with a tubular member or collar 22 which serves to space said disks and maintain the same in proper relation to each other. Each disk carrier is pivotally connected with the adjacent horizontal arm 13 by means of a bolt or similar fastening device 23, which latter passes through alined openings in the yoke of the disk carrier and sliding plate respectively, and also through the slot 14 in the adjacent horizontal arm 13 for engagement with a clamping nut, indicated at 24. Thus it will be seen that by loosening the nuts 24, the disk carriers may be oscillated on the horizontal arms 13 so as to permit the angular adjustment of each set of disks with relation to the supporting frame.

Attention is called to the fact that when the disks are in the position shown in Fig. 1 of the drawing, the soil will be thrown away from the growing plants or crops, and when the position of the disks are reversed, the disks will throw the earth toward the growing plants and thus cover the roots of the latter, the removal and replacement of the disks being effected by manipulating the fastening device 23.

As a means for leveling the soil after the passage of the gang of revolving disks 21, there is provided a pair of trailing disks 25 also preferably concavo-convex in cross section and each mounted on a stub shaft extending laterally from a rearwardly projecting bar 26 mounted on the adjacent horizontal arm 13. The bars 26 are inclined downwardly and rearwardly, while the fixed ends thereof are flattened and provided with perforations for the reception of the bolts 23, the lower face of each flattened portion being provided with serrations or corrugations 27 adapted to engage similar corrugations on a filling block 28. The filling block 28 rests on the upper surface of the adjacent arm 13 and is provided with a depending lug 29 adapted to enter the adjacent slot 14, there being an opening formed in the filling block and intersecting the lug 29 to permit the passage of the bolt 23. Thus it will be seen that by loosening the nuts 24, the bars carrying the trailing disks 25 may be adjusted laterally with respect to the yoke and securely locked in adjusted position by tightening said nuts.

Slidably mounted for vertical movement on suitable rods 30 carried by the yoke 12, are lifting fingers 31, the free ends of which are deflected laterally in front of the revolving disks 21 so as to pick up vines and other trailing vegetation and elevate the same, thereby permitting the passage of the disks 21 when the machine is in operation. The fixed ends of the lifting fingers 31 are provided with suitable clips 32 which embrace the rods 30 and are pierced by clamping bolts 33 so that the lifting fingers may be adjusted vertically of the rods and securely locked in adjusted position.

Secured to the opposite sides of the arched frame 5, are parallel bars 34 which extend vertically above the frame to permit the attachment of a draft device. The draft device comprises converging bars 35 having their inner ends secured to the yoke 12 by suitable clamping nuts 36 and their outer ends brought together and deflected laterally as shown in Fig. 2 of the drawings, one of the bars being extended beyond the other and provided with a terminal hook 37 for attachment to a draft animal. The vertical bars 34 are provided with a series of spaced perforations 38 for the reception of the clamping bolts or other fastening devices so as to permit the draft attachment to be adjusted vertically of the carriage.

The yoke 12 is reinforced and strengthened by the provision of a pair of converging braces 39 having their inner ends attached to the stub axles 6 and their outer ends fastened to the adjacent legs of the yoke 12. Thus it will be seen that by adjusting the braces 39, the yoke 12 may be tilted in either direction so as to regulate the depth cut by the gang of disks. The legs of the yoke 12 are formed with a series of notches or depressions 40 which receive U-shaped clamping bolts 41, the latter being extended through the elongated slots 10 of the handle bars 9 for retaining the yoke in position between said handle bars.

In Fig. 5 of the drawings, there is illustrated a hoe attachment for use in connection with the cultivator, each hoe comprising a blade 42 having its inner end bent upwardly and one longitudinal edge thereof provided with a shank, the upper end of which is reduced to form a shoulder 43 adapted to enter the slot in the adjacent horizontal arm 13, said shoulder being provided with a threaded extension 44 for engagement with a clamping nut 45, whereby the hoe may be adjusted laterally with respect to the arm 13 and securely locked in adjusted position on said arm.

When the cultivator is employed for cultivating strawberries, the disks 21 may be used for cutting or trimming the runners of the vines, said disks also serving to turn the soil, as before stated. If it is not desired to trim the vines, the lifting fingers 31 are positioned on the yoke 12 of the cultivator frame so as to elevate the vines and thus permit the passage of the disks without affecting the growing plants.

Attention is here called to the fact that the trailing disks 25 are adjustable and reversible so as to throw the dirt inward or outward, this adjustment of the trailing disks being effected by removing the bolts and reversing the position of the trailers in the same manner as the gang of disks 21. It will also be noted that the trailers 25 may be adjusted at any angle or inclination with respect to the length of the machine so as to cause the said trailers to throw the dirt either inwardly or outwardly, while at the same time tending to level the surface of the soil after the latter is turned by the gang of revolving disks 21.

When the device is used for shallow surface cultivation, the trailing disks 25 and disk carriers are removed from the horizontal arms 13 and the hoes secured in position on said arms by passing the threaded terminals of the shanks upwardly through the slots in the arms 13 and fastening the same by the clamping bolts.

From the foregoing description it is thought that the construction and operation of the device will be understood by those skilled in the art and further description thereof is deemed unnecessary.

Having thus described the invention, what is claimed as new is:

1. A disk cultivator including a wheeled frame, handle bars secured to the frame, a yoke interposed between the handle bars, adjustable disk carriers mounted on the yoke, concavo-convex disks mounted for rotation on the carriers, and trailing disks disposed at the rear of the concavo-convex disks.

2. A disk cultivator including a wheeled frame, handle bars secured to the frame, a yoke interposed between the handle bars and provided with laterally extending arms, adjustable disk carriers mounted on said arms, trailing disks carried by the horizontal arms, and a single fastening device for locking the trailing disks and carrier disks in adjusted position.

3. A disk cultivator including a wheeled frame, handle bars secured to the frame, a yoke interposed between the handle bars and provided with oppositely disposed arms, plates slidably mounted on the arms, disk carriers bearing against the plates, fastening devices piercing the disk carriers, plates, and arms respectively, filling blocks having openings for the reception of the fastening devices, and trailing arms having interlocking engagement with the filling blocks and provided with disks mounted for rotation at the rear of the disk carriers.

4. A disk cultivator including a wheeled frame having a horizontally disposed slotted arm provided with longitudinally disposed dove-tailed guiding grooves, a plate slidably mounted in said grooves and provided with a serrated face, a disk carrier having a correspondingly serrated face for engagement with the serrated face of the plate, a clamping bolt passing through the disk carrier, plate and slot in the arm respectively, and a clamping nut engaging the bolt for locking the disk carrier in different positions of angular adjustment.

5. A disk cultivator including a wheeled frame having a horizontally disposed slotted arm, a plate slidably mounted on said arm and having its lower face serrated, a disk carrier having a correspondingly serrated face for engagement with the serrated face of the plate, a threaded bolt passing through the disk carrier, plate and slot in the arm respectively, a filling block having a depending lug arranged to enter the slot in the arm and pierced by an opening for the reception of the adjacent bolt, a rearwardly extending arm having a trailing disk mounted for rotation thereon, the inner end of said arm being pierced by the bolt and provided with serrations for engagement with corresponding serrations on the filling block, and a clamping nut engaging the threads on the bolt for locking the several parts in assembled position.

6. A disk cultivator including a wheeled frame, handle bars pivotally mounted on the frame, a yoke interposed between the handle bars and provided with oppositely disposed horizontal arms, rods carried by the yoke, reversible disk carriers depending from the arms of the yoke, lifting fingers slidably mounted on the rods of the yoke, and trailing disks carried by the arms and mounted for rotation at the rear of the disk carriers.

7. A disk cultivator including an arched frame having stub axles extending laterally therefrom and provided with brackets having openings for the reception of said stub axles, handle bars pivotally mounted between the brackets and arched frame, and a yoke interposed between the handle bars and provided with laterally extending arms for supporting a cutting tool.

8. A disk cultivator including an arched frame, stub axles extending laterally from the frame, brackets carried by the arched frame, handle bars interposed between the brackets and arched frame, a yoke interposed between the handle bars and provided with oppositely disposed arms for supporting a cutting tool, adjustable braces forming a connection between the yoke and arched frame, and a draft attachment extending from said yoke to the upper portion of the arched frame and having its free end deflected laterally on one side of the frame.

9. A disk cultivator including an arched frame having stud axles extending laterally therefrom and provided with traction wheels, brackets secured to the arched frame, handle bars interposed between the brackets and arched frame, perforated standards secured to the arched frame, a yoke interposed between the handle bars and provided with means for attachment to a cutting tool, converging bars connecting the yoke and perforated ends of the standards and having their converging ends extended laterally on one side of the cultivator to form a side hitch for attachment to a draft animal, adjustable braces forming a connection between the stub axles and said yoke, and fastening devices extending through the perforations in the uprights and engaging the inclined bars of the draft device.

In testimony whereof I affix my signature in presence of two witnesses.

JOHN W. WATSON. [L. S.]

Witnesses:
 JOE HORN,
 FRED STINES.